(12) United States Patent
Del Giudice et al.

(10) Patent No.: US 12,182,401 B2
(45) Date of Patent: Dec. 31, 2024

(54) DATA COLLECTOR IN AN ELECTRONIC DEVICE

(71) Applicant: IDEMIA IDENTITY & SECURITY FRANCE SAS, Courbevoie (FR)

(72) Inventors: Lauren Marjorie Del Giudice, Courbevoie (FR); Rëmi Louis Marie Duclos, Courbevoie (FR); Pierrick Bieules, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 459 days.

(21) Appl. No.: 17/636,916

(22) PCT Filed: Aug. 12, 2020

(86) PCT No.: PCT/FR2020/051460
§ 371 (c)(1),
(2) Date: Feb. 21, 2022

(87) PCT Pub. No.: WO2021/032919
PCT Pub. Date: Feb. 25, 2021

(65) Prior Publication Data
US 2022/0317884 A1    Oct. 6, 2022

(30) Foreign Application Priority Data

Aug. 21, 2019 (FR) ...................... 1909319

(51) Int. Cl.
*G06F 3/00* (2006.01)
*G06F 3/06* (2006.01)
*G06F 12/02* (2006.01)

(52) U.S. Cl.
CPC .......... *G06F 3/0608* (2013.01); *G06F 3/0631* (2013.01); *G06F 3/0685* (2013.01); *G06F 12/0253* (2013.01)

(58) Field of Classification Search
CPC .... G06F 3/0608; G06F 3/0631; G06F 3/0685; G06F 12/0253
See application file for complete search history.

(56) References Cited

U.S. PATENT DOCUMENTS

| 7,937,419 | B2 | 5/2011 | Ylonen |
| 2010/0114999 | A1* | 5/2010 | Qi ...................... G06F 12/0253 707/E17.014 |
| 2011/0087713 | A1 | 4/2011 | Beard |

FOREIGN PATENT DOCUMENTS

| CN | 107908470 A | 4/2018 |
| WO | 2010130873 A1 | 11/2010 |

OTHER PUBLICATIONS

English language abstract of CN107908470.

* cited by examiner

*Primary Examiner* — Craig S Goldschmidt
(74) *Attorney, Agent, or Firm* — WOMBLE BOND DICKINSON (US) LLP

(57) ABSTRACT

The disclosure relates to a collecting method implemented by a first device including a first volatile memory, this first device interacting with a second device including a second non-volatile memory, the memories comprising objects each constituting an instance of an object-oriented language class. The method comprises an analysis of the objects by running through an object tree from the persistent roots; and on detecting that the analysis is finished, a collecting from the first and second memories for deleting each object that has not been analyzed during said analysis. This analysis in particular comprises, for each object: the identification of each reference pointing to another object; and the definition of a first or second type for each identified reference, this analysis continuing only along the references of the first type.

14 Claims, 6 Drawing Sheets

| OB | STATUS |
|---|---|
| OBL1 | ANALYZED (ET1) |
| OBC1 | ANALYZED (ET1) |
| OBP1 | ANALYZED (ET1) |
| OBL2 | ANALYZED (ET1) |
| OBC2 | ANALYZED (ET1) |
| OBP2 | DISCOVERED BUT NOT ANALYZED (ET2) |
| OBL3 | DISCOVERED BUT NOT ANALYZED (ET2) |
| OBC3 | DISCOVERED BUT NOT ANALYZED (ET2) |
| OBP3 | ANALYZED (ET1) |
| OBT4 | ANALYZED (ET1) |

OBQ

DATA COLLECTOR IN AN ELECTRONIC DEVICE

TECHNICAL FIELD

The disclosure relates to the field of memory management in electronic devices and more particularly relates to the collection of objects in a volatile memory or in a non-volatile memory of an electronic device to free up the memory space.

BACKGROUND

It is known to execute applications compiled in an object-oriented interpreted code in electronic devices. Objects coming from an object language can thus be stored persistently in a non-volatile memory and, if necessary, be transferred into a volatile memory during the execution of an associated application.

Applications interpreted in object language can for example be executed in an architecture including a secure element (ES) which is integrated or embedded in a host electronic device, such as a SOC (System On Chip). To do this, the secure element generally includes an internal volatile memory able to load the executable code and the data of an application interpreted in object language. Such a secure element can, for example, be a modem or a motherboard, or more generally, an independent processing unit configured to interact securely with a host electronic device, into which the secure element is integrated or embedded.

The volatile memory of the secure element is generally of relatively small size, which limits the size and number of applications that can be loaded and executed in the secure element.

The host electronic device can also include a non-volatile memory (MNV), such as a rewritable non-volatile memory for example. This non-volatile memory makes it possible to keep in the memory applications able to be invoked if necessary by the secure element, i.e. the executable code and the data of these applications.

The secure element must then access certain data present in the non-volatile memory of the host device so that this data can be collected and loaded into the volatile memory of the secure element. Access to such data in the non-volatile memory of the host device is however expensive in time and resources, which limits the general performance of the system, in particular when many read or write accesses are necessary in the non-volatile memory of the host device.

In general, the memory space available in such architectures is limited, which may pose a problem, particularly when a large volume of objects must be loaded into a non-volatile memory to execute an object interpreted application.

Today there are already mechanisms for automatically collecting objects from an object-oriented language from the memory of an electronic device for the purpose of freeing up memory space. However, collection systems—currently known as garbage collectors—do not at present always offer satisfactory performance, particularly in architectures storing data in object language in volatile and non-volatile memories. In particular, it is generally necessary to analyze all objects present in the non-volatile memory of a system to implement a collection mechanism with the aim of freeing up memory space.

This type of analysis is not always done optimally. Furthermore, read accesses in non-volatile memories are expensive in time and resources. It is therefore desirable to limit such accesses during a collection process.

At present there is a need for a solution allowing an efficient collection process within an architecture comprising at least one volatile memory and a non-volatile memory, storing objects from an object-oriented language, such as to free up memory spaces in such memories quickly and at limited cost. During such a collection process, it is in particular desirable to keep in the memory as much as possible any relevant objects able to be subsequently invoked by the system.

In general, it is desirable to improve the use of the memory space in an architecture including a volatile memory and a non-volatile memory, by freeing up memory space by a data collection process taking the form of objects in an object-oriented language.

SUMMARY

For this purpose, this disclosure relates to a collecting method, implemented by a first electronic device including a first memory of volatile type, said first electronic device interacting with a second electronic device including a second memory of non-volatile type, the first and second memories comprising objects each constituting an instance of an object-oriented language class, each object being able to comprise at least one reference pointing to another object, the method comprising:

detecting at least one object in the first memory and at least one object in the second memory constituting persistent roots;

analyzing at least a part of the objects contained in the first and second memories by running, from the persistent roots, through an object tree dynamically determined from each reference, included in the analyzed objects, which points to another object, wherein said analysis comprises, iteratively for each analyzed object in the object tree:

if the analyzed object is in the second memory and has no copy in the first memory, allocating in the first memory an object, the so-called clone object, representing a copy of said analyzed object and also an object, the so-called locating object, comprising a first reference pointing to the clone object in the first memory and a second reference pointing to the analyzed object in the second memory;

identifying each reference, contained in said analyzed object, pointing in the object tree to another object, the so-called referenced object; and defining, for each identified reference, a type of said reference from among a first type, the so-called strong reference, and a second type, the so-called weak reference, in accordance with predefined criteria; said analysis continuing along the object tree solely for each referenced object to which points a strong reference from the analyzed object; and upon detecting that said analysis is finished, collecting in the first and second memories for deletion each object that has not been analyzed during said analysis.

Aspects of the disclosure advantageously makes it possible to implement an efficient garbage collector within an architecture comprising a volatile memory and a non-volatile memory, storing objects from an object-oriented language, such as to free up memory space in these memories quickly and at limited cost. This collection process keeps in the memory as many relevant objects, able to be subsequently invoked by the first device, as possible, based on criteria which are predefined within this meaning.

The garbage collector of the disclosure makes it possible to select and delete unreachable objects contained in a volatile memory or in a non-volatile memory of the system, in order to free up a maximum of memory space.

According to an example, during said analysis, each reference of an analyzed object is defined as a weak reference if at least one of the following conditions is satisfied:
a) said reference points to any object that has been allocated in the first memory during said analysis; and
b) said reference is a reference of a locating object contained in the first memory, said reference pointing to an associated object contained in the second memory.

According to an example, during said analysis, each reference of an analyzed object is defined as a strong reference if said reference points to an object which has been allocated in the first memory prior to said analysis and if said reference does not point from the first to the second memory.

According to an example, said method is triggered on detection of a predefined event comprising at least one of:
  receiving an order issued by an operating system of the first electronic device or by an application executed by said first electronic device; or
  detecting that the first memory or the second memory is saturated or has reached a predefined occupancy threshold.

According to an example, the method further comprises:
  allocating, in the first memory, a marking object comprising marking information associated with each object already present in the first and second memories on initiating said analysis; and
  updating during said analysis such that said marking information indicates for each associated object whether said object i) has already been analyzed during said analysis, ii) has not yet been analyzed but for which a reference pointing to said object has already been identified, or iii) has not yet been analyzed and for which no reference pointing to said object has yet been identified;
said collection being made by selecting the objects to be deleted as a function of said marking information.

According to an example, said marking object is collected from the first memory during said collection.

According to an example, the marking object is recorded in a memory container with each other object of the object tree, contained in the first memory.

According to an example, each object of the object tree contained in the first volatile memory is one from among:
  a transient object, instantiated by any application;
  a clone object representing a copy of an object present in the second memory;
  a locating object allocated in the first memory in association with a clone object of the first memory and a corresponding object in the second memory; or
  said marking object.

According to an example, during said collection, the first electronic device deletes in decreasing order of priority:
  at least one first object in the first memory that has not been analyzed during said analysis and for which no reference has been identified as pointing to said at least one first object; then
  at least one second object in the second memory which has not been analyzed during said analysis and for which no reference has been identified as pointing to said at least one second object.

According to an example, the first electronic device detects that the analysis is finished when it has analyzed all the objects of the object tree to which points at least one strong reference.

According to an example, said collection comprises:
  deleting, from the first memory, each clone object representing the copy of any object deleted from the second memory during said collection.

According to an example, said collection comprises:
  deleting, from the first memory, each locating object which is associated with any clone objected deleted from the first memory during said collection.

According to an example, the method further comprises, on detection of a predefined event before said analysis is finished, an anticipative collection during which the first electronic device deletes at least one object, the so-called collected object, which satisfies the following conditions:
  the collected object has already been analyzed during said analysis;
  the collected object is not associated with an application being executed; and
  the collected object is a clone object or a locating object.

Consequently, the disclosure also relates to a computer program on an information medium, this program being able to be implemented in an electronic device such as a chip card or a computer, this program including instructions suitable for implementing steps of a collecting method as defined in this document.

Aspects of the disclosure also relates to a recording (or information medium) medium readable by a computer, and including instructions of a computer program as mentioned above.

Note that the computer programs mentioned in this document can use any programming language, and be in the form of source code, object code, or intermediate code between source code and object code, such as in a partially compiled form, or in any other desirable form.

In addition, the recording media mentioned above can be any entity or device capable of storing the program. For example, the medium can include a storage medium, such as a ROM, for example a CD-ROM or a microelectronic circuit ROM, or else a magnetic recording means, for example a diskette (floppy disk) or a hard disk.

Moreover, the recording media may be a transmissible medium such as an electrical or optical signal, which can be conveyed via an electrical or optical cable, by radio or by other means. The program according to the disclosure can in particular be downloaded over a network of Internet type.

Alternatively, the recording media may correspond to an integrated circuit in which the program is incorporated, the circuit being adapted to execute or to be used in the execution of the method in question.

The disclosure also relates to a first electronic device as defined above.

In particular, aspects of the disclosure relate to an electronic device, the so-called first electronic device, containing a first memory of volatile type, said first electronic device being configured to interact with a second electronic device containing a second memory of non-volatile type, the first and second memories comprising objects each constituting an instance of an object-oriented language class, each object being able to comprise at least one reference pointing to another object, the first electronic device comprising:
  a detecting module for detecting at least one object in the first memory and at least one object in the second memory constituting persistent roots;

an analyzing module configured to perform an analysis of at least a part of the objects contained in the first and second memories by running, from the persistent roots, through an object tree dynamically determined from each reference, included in the analyzed objects, which points to another object;

wherein said analysis comprises, iteratively for each analyzed object in the object tree:
if the analyzed object is in the second memory and has no copy in the first memory, allocating in the first memory an object, a so-called clone object, representing a copy of said analyzed object as well as an object, the so-called locating object, comprising a first reference pointing to the clone object in the first memory and a second reference pointing to the analyzed object in the second memory;
identifying each reference, contained in said analyzed object, pointing in the object tree to another object, the so-called referenced object; and
defining, for each identified reference, a type of said reference from among a first type, the so-called strong reference, and a second type, the so-called weak reference, in accordance with predefined criteria;
said analysis continuing along the object tree solely for each referenced object to which points a strong reference from the analyzed object; and a collecting module configured, upon detecting that said analysis is finished, to delete from the first and second memories each object that has not been analyzed by the analyzing module during said analysis.

According to an exemplary method, aspects of the disclosure are implemented by means of software and/or hardware components. From this perspective, the term "module" can refer in this document to both a software component and a hardware component or to a set of hardware and software components.

A software component is equivalent to one or more computer programs, one or more sub-programs of a program, or more generally any element of a program or a software package able to implement a function or a set of functions, according to that which is described below for the module in question. In the same way, a hardware component is equivalent to an element of a hardware assembly able to implement a function or a set of functions, according to that which is described below for the module in question.

It should be noted that the different examples mentioned above in relation to the collecting method of the disclosure, and also the associated advantages, apply in a similar manner to the first electronic device of the disclosure.

For each step of the collecting method of the disclosure described in this document, the first electronic device within the meaning of the disclosure may comprise a corresponding module configured to perform said step.

The disclosure also relates to a system comprising a first electronic device and a second electronic device as defined in this document, these two devices being configured to interact together to implement a collecting method in accordance with the disclosure.

BRIEF DESCRIPTION OF THE DRAWINGS

Other features and advantages of this disclosure will become apparent from the description given below, with reference to the appended drawings which illustrate examples thereof without any limitation. In the figures.

DETAILED DESCRIPTION

As previously indicated, the disclosure aims to collect data presenting in appearing in the form of an object-oriented language in an architecture comprising at least a volatile memory and a non-volatile memory.

As well known to those skilled in the art, an object in the context of an object-oriented interpreted language constitutes an instance of a class of the language in question. In addition, a class is a programming descriptor containing a set of attributes and methods in the language under consideration. As will be described below, an object may be of a different nature and is able to comprise at least one reference pointing to another object (although this is not necessary the case).

Today, various types of object-oriented interpreted languages may be compiled into bytecode before being executed by an interpreter (or compiled by a compiler). Thus, a Java or Java Card application is usually sent in the form of bytecode to a target device such as a secure element as described above. This secure element performs a compilation or interpretation, where applicable on the fly, to translate the bytecode into machine code before execution. To do this, the secure element implements a specific software program known as a "virtual machine", well-known to those skilled in the art.

As already stated, the loading of interpretable codes of bytecode type from a non-volatile memory into a volatile memory, particularly in the RAM of a secure element embedded in a host device, poses problems of memory space management.

For this purpose, aspects of the disclosure, according to different examples, particularly relate to a collecting method implemented by a first electronic device comprising a first memory of volatile type, this first electronic device interacting with a second electronic device containing a second memory of non-volatile type. This method particularly aims to free up the memory space by deleting objects from the first and second memories, these objects each constituting the instance of a class of an object-oriented language. To do this, the collecting method involves an analysis of objects contained in the first and second memories by running, from persistent roots, through an object tree dynamically determined from each reference, included in the analyzed objects, which points to another object. During this analysis, for each analyzed object in the object tree, the first electronic device identifies each reference included in the analyzed object and defines the type of reference, namely a so-called "strong" or "weak" reference, according to predefined criteria. These criteria are used to make a sort of the tree objects, sorting those which are the most useful from those which can or must be deleted during the collecting method. This analysis continues along the object tree solely for each referenced object to which points a strong reference from at least one analyzed object. Once the analysis is finished, a collecting step is taken to delete from the first and second memories each object which has not been analyzed during said analysis.

The disclosure also relates to the first electronic device, a system comprising the first and second electronic devices, and also a computer program for executing the collecting method of the disclosure and a recording medium including such a computer program.

Other aspects and advantages of this disclosure will become apparent from the examples described below with reference to the drawings mentioned above.

In this document, examples of implementation of the disclosure are described in the context of a secure element (ES) interacting with a host electronic device, such as a SOC (System On Chip), for example, in which the secure element is embedded or integrated. Implementations of the disclosure are however possible in other environments.

As defined by the "GlobalPlatform" standards organization well-known to those skilled in the art, a secure element is a hardware and software platform configured to securely host applications and their associated sensitive data (cryptographic keys, algorithms etc.), in compliance with rules set by a trusted third party. A secure element supplies a secure execution environment to applications. It can take various forms, such as an UICC (Universal Integrated Circuit Card) module, an embedded secure element (or "embedded SE" or else eSIM for "embedded Subscriber Identity Module") as a discrete or integrated element, or else a microSD card. A UICC module and a microSD card are generally removable. Each form of secure element is intended to be used in very specific applications and must meet requirements specific to the market in question.

A secure element can for example be used in mobile telephony to authenticate the user of a communication terminal to a mobile network to which it is subscribed, or else to implement a payment application in the banking field.

However, the disclosure is not exclusively applicable to SE/SOC architectures but more generally relates to the management of memory space, and in particular a collection process, in an architecture comprising a first volatile memory and a second non-volatile memory.

The disclosure is applicable to various architectures or systems in which object-oriented interpreted code must be loaded into a first volatile memory for executing an application.

In particular, the disclosure can be implemented in a chip card, in a communication terminal or in any other appropriate system including a volatile memory and a non-volatile memory.

Unless otherwise specified, elements which are the same or similar across several figures bear the same reference signs and have identical or similar features, such that these common elements will generally not be described again for the sake of simplicity.

Figure 1:
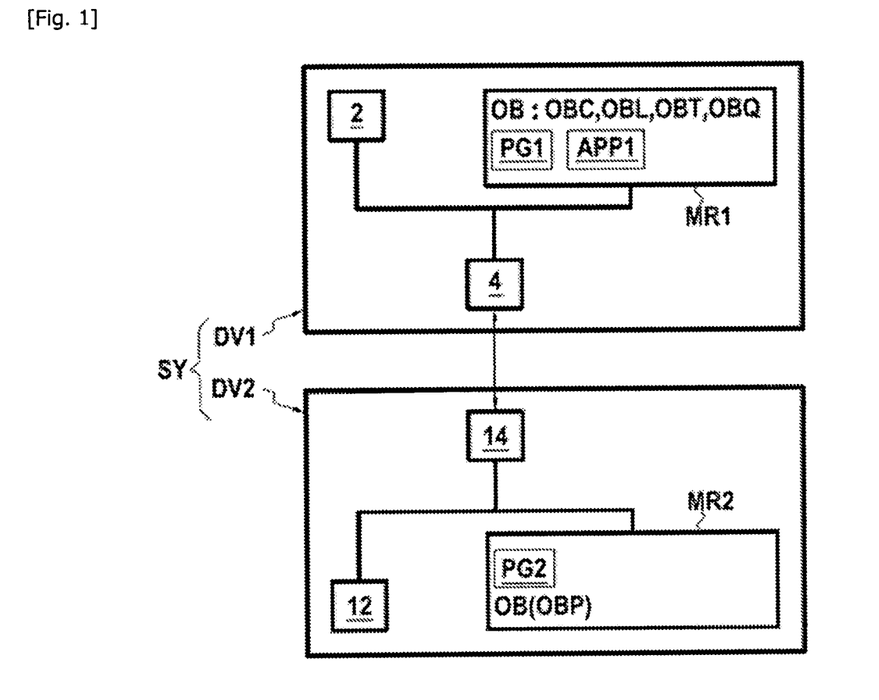
FIG. 1 schematically represents a system comprising a first electronic device and a second electronic device, according to an aspect of the disclosure.

FIG. 1 shows a system SY including a first electronic device DV1 and a second electronic device DV2, according to an example. The first and second electronic devices DV1 and DV2 are configured to interact together to allow, in particular, the implementation of a collecting method as described hereinafter.

In the example under consideration here, the first device DV1 is a secure element (SE) as already described previously, this latter being integrated or embedded in the second electronic device DV2 (a SOC for example) serving as host device. Such a secure element can, for example, be embedded or integrated in the form of a hardware block, in a modem or a chip. More generally, the secure element can be an independent processing unit, configured to securely interact with the host electronic device, into which the secure element is integrated or embedded. Other implementations are however possible.

According to the example shown in FIG. 1, the first electronic device DV1 and the second electronic device DV2 are therefore two separate electronic devices interacting together. The first device DV1 may or may not be included in the second device DV2. As a variant, the first electronic device DV1 and the second electronic device DV2 form one and the same electronic device.

The first electronic device DV1 in this example comprises a processor 2, a volatile memory MR1 (RAM) and a communication interface 4 for communicating with the second electronic device DV2.

The volatile memory MR1 constitutes a "first memory" within the meaning of the disclosure. This memory is able to store, in particular, objects OB in an object-oriented language. As described in more detail further on, the objects OB stored in the volatile memory MR1 can be of different types, and may in particular comprise objects in at least one of the following types: clone object OBC, locating object OBL, transient object OBT and marking object OBQ, as described in detail further on.

The objects OB stored in the volatile memory MR1 may for example be associated with an application APP1 which is able to be executed by the first electronic device DV1. This application APP1 may comprise executable code (or object-oriented interpreted code) and associated data. This executable code may be interpreted by the first device DV1 by implementing a specific software program, namely a virtual machine. This executable code is for example encoded in the Java or Java Card language, other languages being nonetheless possible.

The volatile memory MR1 constitutes a recording medium (or information medium) in accordance with an example, readable by the first electronic device DV1, and on which may be recorded a computer program PG1 in accordance with a particular example. In a variant, this program PG1 is stored in a non-volatile memory (not represented) of the first device DV1. This computer program PG1 includes instructions for executing the steps of a collecting method which is described further on according to particular examples.

In the following examples, the computer program PG1 constitutes a garbage collector, i.e. an automatic memory management system.

The second electronic device DV2 comprises in this example a processor 12, a non-volatile memory MR2 (also known as a persistent memory) and a communication interface 14 for communicating with the first electronic device DV1.

The non-volatile memory MR2 constitutes a "second memory" within the meaning of the disclosure. This memory MR2 is for example a rewritable non-volatile memory, for example of Flash, EEPROM or other type. This memory is used to store objects OBP, so-called persistent objects, in an object-oriented language. These objects may be associated for example with the application APP1 executable in the first electronic device DV1.

The non-volatile memory MR2 constitutes a recording medium (or information medium) in accordance with a particular example, readable by the second electronic device DV2, and on which may be recorded a computer program PG2 in accordance with a particular example. This computer program PG2 is executed by the second device DV2 to interact with the first device DV1.

In general, the application APP1, once stored in the non-volatile memory MR2 of the second device DV2, must be loaded into the volatile memory MR1 of the first device DV1 to be able to be executed. The first device DV1 has no direct access, either read or write, in the non-volatile memory MR2 of the second electronic device DV2. In other words, to access an object OB in read and/or write, the first device DV1 must first of all escalate a copy (a clone object OBC) of the persistent object OBP from the non-volatile memory MR2 to the volatile memory MR1, if such a copy is not already present in the memory MR2.

Note that certain elements generally present in a secure element and in a SOC intended to interact with such a secure element have been deliberately omitted since they are not necessary to the understanding of this disclosure.

The system SY represented in FIG. 1 constitutes only one example, other implementations being possible within the scope of the disclosure. Those skilled in the art will in particular understand that certain elements of the system SY are only described here to facilitate the understanding of the disclosure, these elements not being necessary to implement aspects of the disclosure.

Figure 2:
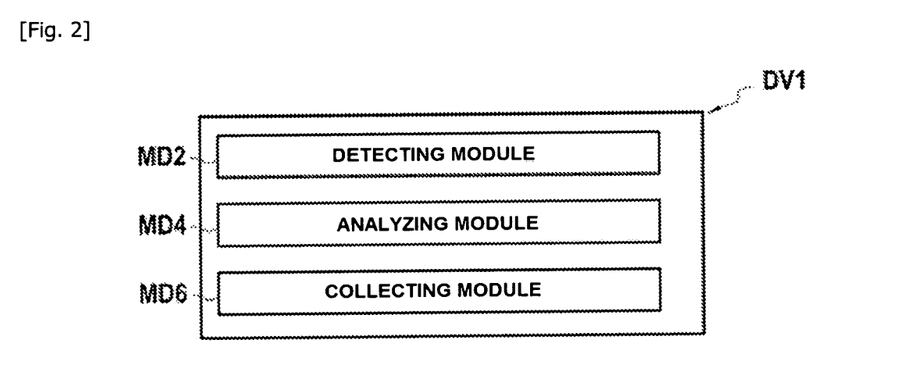
FIG. 2 schematically represents functional modules implemented by the first electronic device of FIG. 1, according to an aspect of the disclosure.

Moreover, FIG. 2 shows, according to a particular example, modules implemented by the processor 2 controlled by the computer program PG1, namely: a detecting module MD2, an analyzing module MD4 and a collecting module MD6.

More specifically, the detecting module MD2 is configured to detect at least one object OB in the first memory MR1 and at least one object OB in the second memory MR2 each constituting a persistent root denoted RC. As described below, these root objects RC constitute the base of an object tree that the first device DV1 may run through to analyze the component objects thereof. The objects OB of this tree are connected to one another by references contained in certain objects OB, each reference pointing to a single other object.

The analyzing module MD4 is configured to carry out an analysis of at least a part of the objects OB contained in the first and second memories MR1, MR2 by running, from the persistent roots RC, through an object tree dynamically determined from each reference, included in the analyzed objects, which points to another object.

During this analysis, the analyzing module MD4 performs a certain number of steps iteratively for each object OB analyzed in the object tree. First of all, if the object OB analyzed is in the non-volatile memory MR2 and has no copy in the volatile memory MR1, the analyzing module MD4 allocates in the volatile memory MR1 an object OBC, the so-called clone object, representing a copy of the analyzed object OB as well as an object OBL, the so-called locating object, comprising a first reference pointing to the clone object OBC in the first volatile memory MR1 and a second reference pointing to the analyzed object OB in the non-volatile memory MR2. Still during this analysis, the analyzing module MD4 identifies each reference, including (where applicable) in the analyzed object OB, pointing in the object tree to another object OB, the so-called referenced object, and then defines, for each identified reference, a type of the reference from among a first type, the so-called strong reference, and a second type, the so-called weak reference, in accordance with predefined criteria.

As described below, the analyzing module MD4 thus begins the analysis of the tree objects by the persistent roots RC and continues this analysis along the object tree only for each referenced object OB to which points a strong reference (first type) from the analyzed object OB. Thus, if all the objects of the tree to which points at least one strong reference have been analyzed by the analyzing module MD4, the analysis is considered as being finished.

The collecting module MD6 is configured, on detecting that the analysis of the analyzing module MD4 is finished, to delete from the first and second memories MR1, MR2 each object OB which has not been analyzed by the analyzing module MD4 during said analysis.

The configuration and the operation of the modules MD2-MD6 defined above will be more precisely apparent in examples described hereinafter. Note that the modules MD2-MD6 as represented in FIG. 2 represent only a non-limiting example of aspects of the disclosure.

Figure 3:
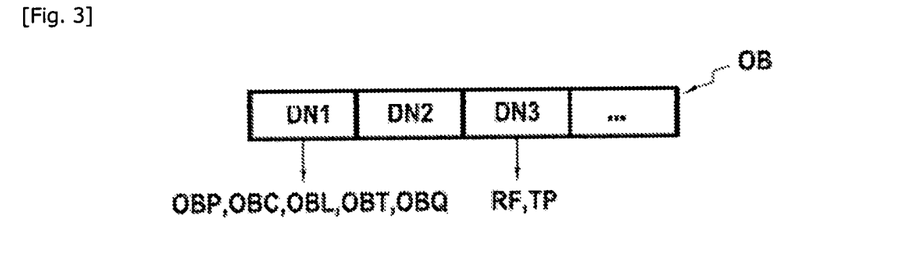
FIG. 3 schematically represents the structure of the objects contained in the memories of the system of FIG. 1, according to an aspect of the disclosure.

FIG. 3 schematically represents the structure of any object OB able to be stored in the first volatile memory MR1 or in the second non-volatile memory MR2, according to a particular example. Each object OB can thus comprise metadata including at least one from among:
  a type data (or classification data), denoted DN1, defining the type of the object OB under consideration (for example a clone object OBC, a locating object OBL, a transient object OBT, a marking object OBQ, etc.);
  a size datum, denoted DN2, representing the size of the object OB under consideration;
  reference data DN3 defining at least one reference RF pointing to another object OB as well as, where applicable, a type TP of said reference RF; and
  any other appropriate information.

Each object OB constitutes the instance of a class defined in an object-oriented language. An object OB may or may not be associated with the application APP1 executable by the first device DV1. If so, the object OB therefore forms the instance of a class in the object-oriented language used in the application APP1.

Note that each reference RF defined in the reference data DN3 points to a single other object OB. Each reference RF can be defined, for example on the basis of an identifier (address or other) of the other object OB to which points the reference RF under consideration.

In this example, a persistent object OBP denotes an object (within the meaning of an object-oriented language) stored persistently in a non-volatile memory, namely the memory MR2 in this example.

Moreover, as already indicated, the first device DV1 has no direct access, either read or write, in the non-volatile memory MR2 of the second electronic device DV2. In other words, to access in read and/or write a persistent object OBP present in the non-volatile memory MR2, the first device DV1 must generate in its volatile memory MR1 a clone object OBC constituting a copy of the persistent object OBP under consideration (if such a copy is not already present in the volatile memory MR1).

In this document, a clone object OBC therefore denotes an object (within the meaning of an object-oriented language) which is stored in the volatile memory MR1 of the first device DV1 and which is the copy of a persistent object OBP stored in the non-volatile memory MR2 of the second device DV2.

Moreover, for each clone object OBC allocated in the volatile memory MR1, the first device DV1 also records in the volatile memory MR1 an associated locating object OBL. A locating object OBL comprises location data associating a persistent object OBP in the non-volatile memory MR2 with a clone object OBC in the volatile memory MR1. More precisely, the location data of a locating object OBL comprises a first object reference RF indicating where the persistent object OBP is stored in the non-volatile memory MR2 and a second object reference RF indicating where the associated clone object OBC is stored in the volatile memory MR1. Each locating object OBL therefore comprises at least two references RF respectively pointing to a clone object OBC in the volatile memory MR1 and to an associated persistent object OBP in the non-volatile memory MR2. A locating object OBL may where applicable comprise one or more additional references pointing to other objects OB in the volatile memory MR1.

The references RF defined in each locating object OBL may for example be an object identifier or an address (either an address in the volatile memory MR1 to reference a clone object OBC or another, or an address in the non-volatile memory MR2 to reference a persistent object OBP).

The recording of the locating data of each persistent object OBP in the form of an object (the so-called locating object) OBL in particular makes it possible to dynamically allocate a memory space of adequate size to the location data in the first volatile memory MR1, thus optimizing the use of the memory space. The static assignment of a memory space for such location data would block the use of a more or less large memory space in the volatile memory MR1. This would result in difficulties in setting the size of this memory space, which would risk being either too small to house all the location data, or too large, which would be resource-expensive and would limit the use of the volatile memory MR1 for other purposes. This particular example makes it possible to dynamically assign an appropriate memory space in the volatile memory MR1 to store location data, the volume of which is liable to vary.

In this document, a transient object OBT denotes an object (within the meaning of an object-oriented language) which is generated and stored transiently by the first device DV1 in the volatile memory MR1, for example during the execution of the application.

APP1 or any other applications or processes.

In this document, a marking object OBQ denotes an object (within the meaning of an object-oriented language) which is generated and stored by the first device DV1 in the volatile memory MR1 during the collecting method of the disclosure, as explained in more detail hereinafter. This marking object OBQ is dedicated to the garbage collector implemented by the first device DV1.

A particular example of the disclosure will now be described with reference to FIGS. 4-12. More precisely, the first electronic device DV1 (FIGS. 1-2), interacting with the second electronic device DV2, implements the collecting method of the disclosure by executing the computer program PG1. More particularly, the first device DV1 implements a garbage collector by executing the instructions of the computer program PG1.

Figure 4:
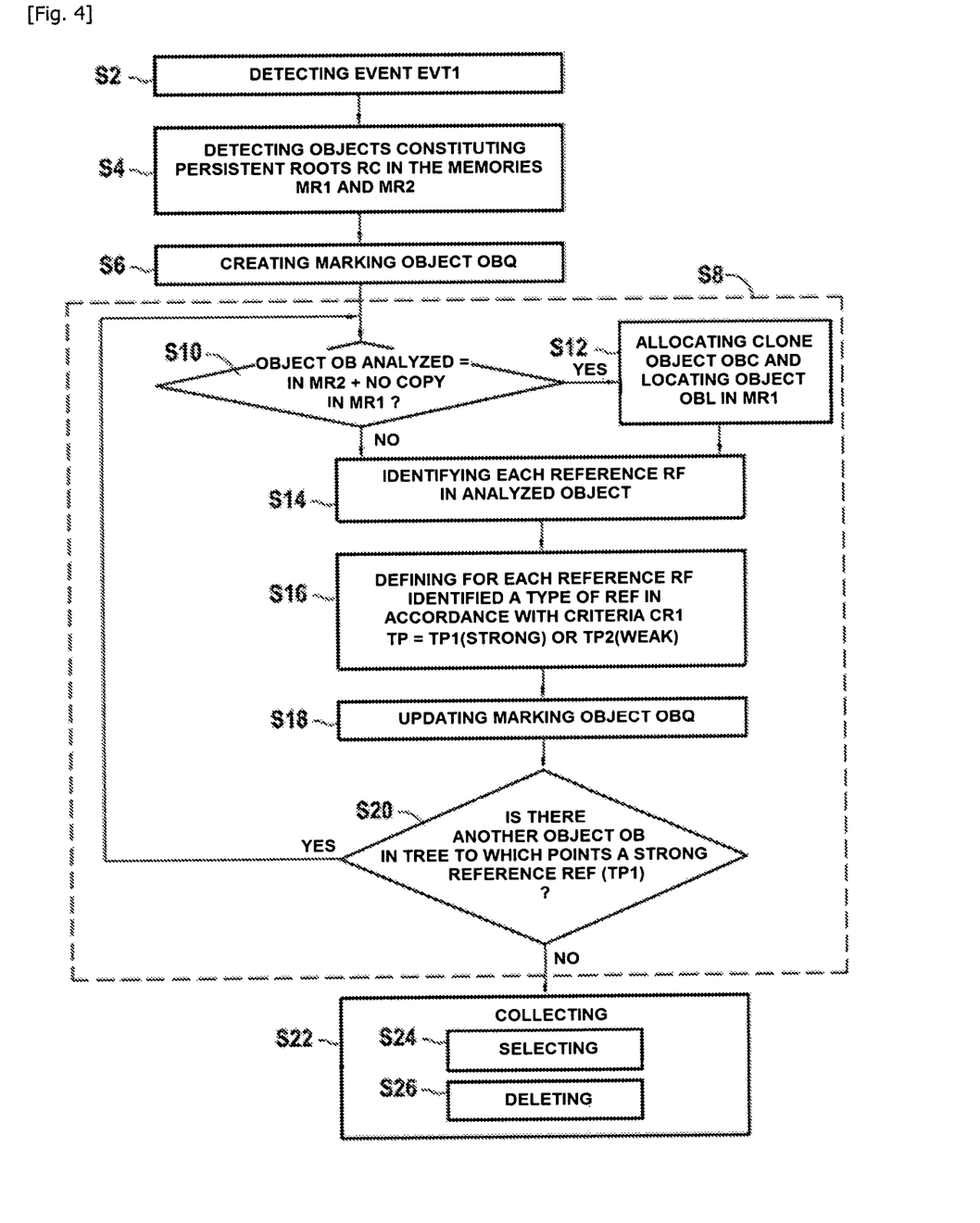
FIG. 4 represents, in the form of a diagram, the steps of a collecting method according to an aspect of the disclosure.

FIG. 4 represents the steps implemented by the first electronic device DV1 in this particular example.

Figure 5:
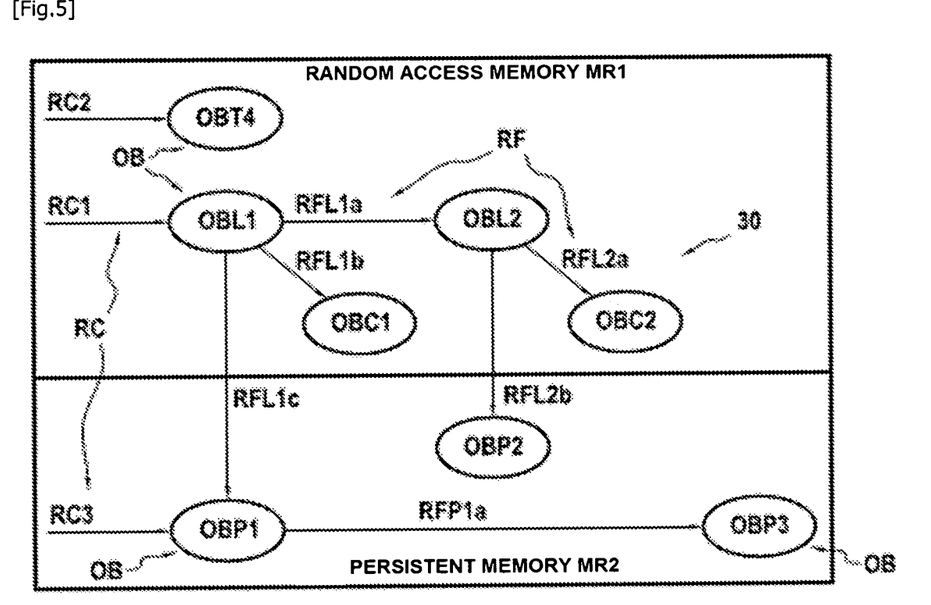
FIGS. 5, 6 and 7 schematically represents an object tree in the memory of the system of FIG. 1, during a collecting method according to an aspect of the disclosure.

FIG. 5 schematically represents an example of an object tree 30 in an initial state, i.e. before initiation of the collecting method. This tree 30 comprises various objects OB stored in the volatile memory MR1 and in the non-volatile memory MR2. These objects OB are connected to one another by references RF contained in certain objects OB and pointing to other objects OB. These interconnected objects collectively form the object tree (or structure) 30 in which the persistent roots RC constitute the base.

It is supposed in this example that at least one persistent root RC is present in each of the memories MR1 and MR2. To do this, it is necessary that the first device DV1 has beforehand transferred certain objects OB from the non-volatile memory MR2 of the second device DV2 into its volatile memory MR1. The object tree 30 thus extends in the memories MR1 and MR2.

As already indicated, each reference RF points from an object OB to a single other object OB. A reference RF may point from an object OB in the volatile memory MR1 to another object OB in the volatile memory MR1 or, alternatively, to another object OB stored in the non-volatile memory MR2. Similarly, a reference RF may point from an object OB in the non-volatile memory MR2 to another object in the non-volatile memory MR2. On the other hand, a reference RF cannot point from an object OB in the non-volatile memory MR2 to another object OB in the volatile memory MR1. As will be understood by those skilled in the art, the first device DV1 is here configured as default to not create any reference RF pointing from the non-volatile memory MR2 to the volatile memory MR1 in order to avoid the occurrence of memory inconsistencies, particularly in the case of a power cut to the non-volatile memory.

The object tree 30 shown in FIG. 5 constitutes only one non-limiting example with the aim of facilitating the understanding of an aspect of the disclosure.

During a detecting step S2 (FIG. 4), the first device DV1 detects a predefined event EVT1. On detecting this event EVT1, the first device DV1 triggers a collecting method and continues to the step S4 described hereinafter.

The predefined element EVT1 comprises at least one from among:
receiving a command issued by an operating system of the first electronic device DV1 or by an application APP1 executed by the first electronic device DV1; and
detecting that the volatile memory MR1 or the non-volatile memory MR2 is saturated or has reached a predefined occupancy threshold.

Other configurations are however possible to trigger the execution of a collecting method of the disclosure. The collecting method can for example be triggered in response to any order received by the first device DV1, this command being for example able to be received from the outside or initiated by a user of the first device DV1.

During step S4, the first device DV1 detects at least one object OB in the volatile memory MR1 and at least one object OB in the non-volatile memory MR2 constituting persistent roots RC of the object tree 30, as represented in FIG. 5. In this case, the first device DV1 thus detects that the locating object OBL1 and the transient object OBT4 stored in the volatile memory MR1 as well as the persistent object OBP1 stored in the non-volatile memory MR2 each constitute persistent roots respectively denoted RC1, RC2 and RC3. These objects OBL1, OBT4 and OBP1 together form the base (the root) from which extend the branches of objects of the tree 30. The number and nature of the persistent roots may vary according to the case.

Figure 6:
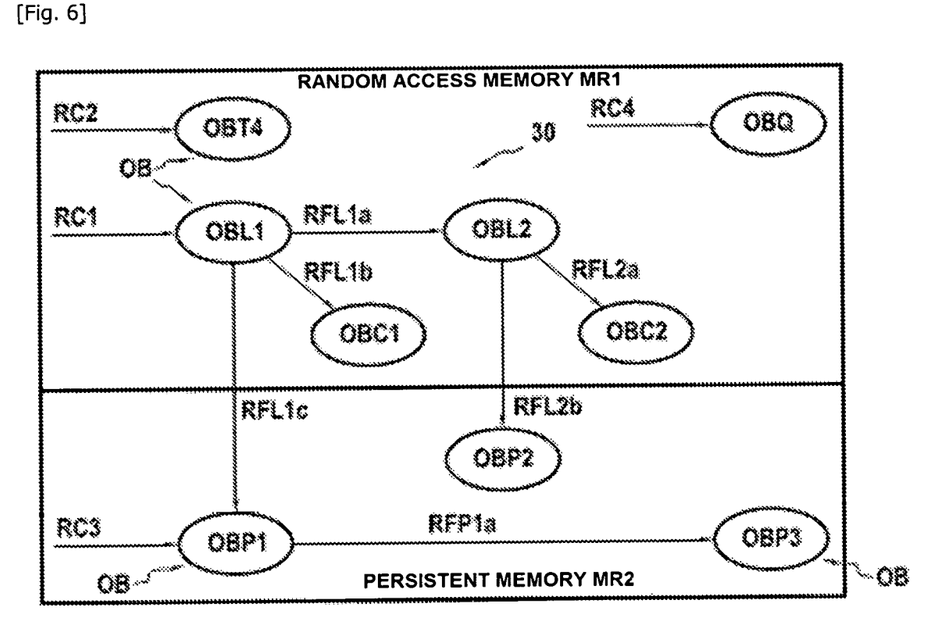

Furthermore, as represented in FIG. 6, the first device DV1 generates and stores (S6), in the volatile memory MR1, a marking object OBQ comprising marking information. The nature and the use of this marking information will be more clearly apparent hereinafter. This marking object OBQ may be considered by the first device DV1 as a persistent root of the tree 30. This marking object OBQ can where applicable be allocated later during the analysis S8 that follows. Other implementations are also possible in which at least a part (or even the entirety) of the marking information is not stored in such a marking object OBQ.

The first device DV1 then carries out an analysis (S8), also known as an inspection or scan, of at least a part of the objects OB contained in the first and second memories MR1, MR2 by running, from the persistent roots RC detected in S4, through the object tree 30. To do this, the first device DV1 dynamically determines (or discovers) the object tree 30 during the analysis S8 from each reference RF included in the analyzed objects OB, which points to another object OB of the tree.

During the analysis S8, the first device DV1 sequentially reads or scans the objects OB of the object tree 30 starting from the persistent roots RC1-RC3 and by running through the object tree 30 in successive stages. To do this, for each analyzed object OB, the first device DV1 identifies the possible reference or references RF defined by this object OB pointing to one or more of the other objects OB of a higher stage of the tree.

In this example, the first device DV1 analyzes only the objects OB in the memories MR1, MR2 and not the values liable to be stored in these memories. It is the objects OB which occupy the most space in the memories MR1, MR2. The collecting method therefore aims to delete these objects OB to free up a maximum of memory space.

In the example described here, during the analysis S8, the first device DV1 iteratively performs the steps S10-S20 (FIG. 4) for each analyzed object OB, starting from the persistent roots RC1-RC3 identified in S4.

More particularly, during a verifying step S10, the first device DV1 determines whether or not the object OB being analyzed—the so-called current object—is in the non-volatile memory MR2 and has no copy (i.e. no clone object) in the volatile memory MR1. If these two conditions are met, the method continues to step S12. Otherwise (i.e. if at least one of these two conditions is not met), the method continues directly to step S14.

During the allocating step S12, the first device DV1 allocates in the volatile memory MR1 a clone object OBC representing a copy of the current object OB and also allocates a locating object OBL comprising a first reference RF pointing to the clone object OBC in the volatile memory MR1 and a second reference RF pointing to the current object OB in the non-volatile memory MR2. The clone object OBC and the locating object OBL thus allocated in S12 are then integrated into the object tree 30 such that they can be analyzed where applicable by the device DV1 during the analysis S8. The locating object OBL thus allocated in the volatile memory MR1 can be pointed to from the reference RF of another locating object OB in the volatile memory MR1.

In this example, it is supposed that the first device DV1 starts by analyzing (S8) the locating object OBL1 in the volatile memory MR1 (several choices are possible). The first device DV1 thus detects in S10 that the current object OBL1 is not stored in the non-volatile memory MR2 (in other words, it is not a persistent object OBP) and therefore continues to step S14.

During the identifying step S14, the first device DV1 identifies each reference RF which is defined (where applicable) in the object OB being analyzed (FIG. 6). To do this, the first device DV1 reads the contents of the current object OB and determines if one or more references RF are contained in this object OB.

In this example it is supposed that the first device DV1 identifies that the locating object OBL1 comprises 3 references RF, namely:
  a reference RFL1a pointing to another locating object OBL2 stored in the volatile memory MR1;
  a reference RFL1b pointing to an associated clone object OBC1 which is stored in the volatile memory MR1; and
  a reference RFL1c pointing to an associated persistent object OBP1 which is stored in the non-volatile memory MR2.

It is here supposed that the references RFL1a, RFL1b and RFL1c comprise addresses respectively identifying the objects OBL2, OBC1 and OBP1. The clone object OBC1 therefore here represents a copy of the persistent object OBP1.

The first device DV1 then performs a defining step S16 during which it defines, for each reference RF identified in S14 in the current object OB, a type TP of said reference RF from among a first type TP1, the so-called "strong" reference, and a second type TP2, the so-called "weak" reference, in accordance with predefined criteria CR1. In other words, the first device DV1 applies predefined criteria CR1 to determine the respective type TP—either TP1 or TP2—for each reference RF identified in the current object OB.

Various predefined criteria CR1 can be implemented according to the situation, as will be understood by those skilled in the art. As will be more clearly apparent below, these criteria CR1 are defined such as to make a sort of the objects OB of the tree 30 between those which are considered as being the most useful and those which can or must be deleted during the collecting method.

The references of type TP1 and TP2 are respectively denoted as "strong" and "weak" for the sake of simplicity, although other names are possible.

Still in this example, it is supposed that the predefined criteria CR1 specify that each reference RF of a current object OB is defined as a weak reference (TP2) during the analysis S8 if at least one of the following conditions is satisfied;
  a) said reference RF points to any object OB (namely a clone object or a locating object) which has been allocated in the volatile memory MR1 during the analysis S8; and
  b) the reference RF under consideration is a reference of a locating object OBL contained in the volatile memory MR1, this reference RF pointing to an associated object OB (i.e. a persistent object OBP) contained in the non-volatile memory MR2.

In other words, if any one or both of the conditions a) and b) above are met, the reference RF under consideration is defined (S16) as a reference of the type TP2 (weak reference). Note that if the current object is a locating object OBL, its reference RF to the corresponding persistent object OBP in the non-volatile memory MR2 is still defined as a weak reference, whether this object OBP has been allocated in the volatile memory MR1 during or before the analysis S8.

In this example, if neither of the conditions a) and b) are satisfied, the reference RE under consideration is defined as being a strong reference (type TP1).

In other words, the predefined criteria CR1 specify in this example that each reference RF of an object OB being analyzed is defined (S16) as a strong reference (type TP1) if said reference RF points to an object OB (clone object OBC or locating object OBL) which has been allocated in the volatile memory MR1 before the analysis S8 and if the reference RF in question does not point from the volatile memory MR1 to the non-volatile memory MR2.

Figure 7:
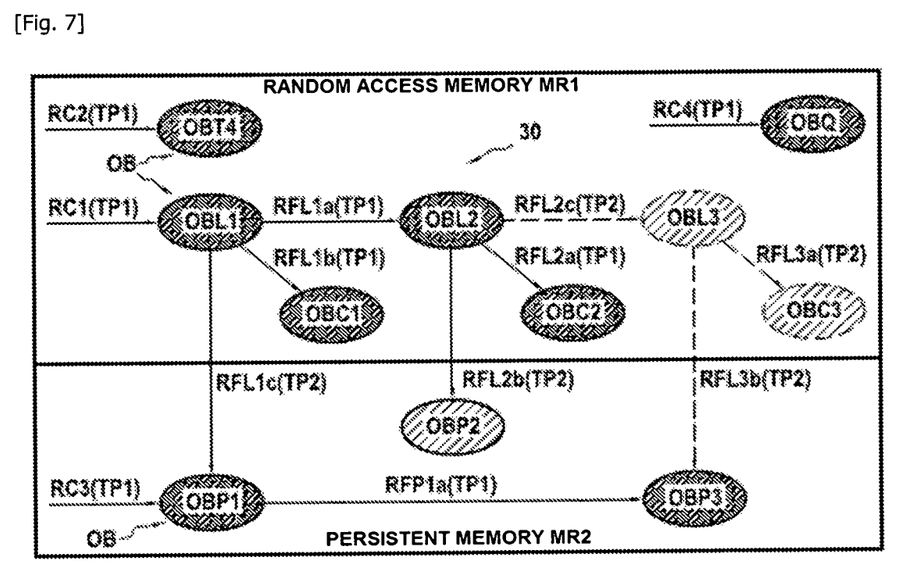

Thus, in the example under consideration here, the first device DV1 defines (S16) for the current object OBL1 the references RFL1*a* and RFL1*b* as strong references (type TP1) and the reference RFL1*c* as a weak reference (type TP2) as this latter points from the volatile memory MR1 to the non-volatile memory MR2 (FIG. 7).

In this example, the first device DV1 records the type TP of each reference RF in the current object OB itself. More precisely, the first device DV1 encodes, in the reference data DN3 of the current object OBL1, the first type TP1 (strong reference) in association with the references RFL1*a* and RFL1*b* and the second type TP2 (weak reference) in association with the reference RFL1*c* (FIG. 3). The reference data DN3 can therefore here take, for example, the form of a respective bit encoding either the value TP1, or the value TP2, for each reference RF defined in the object OB in question.

Still during the analysis S8, the first device DV1 updates (S18, FIG. 4) the marking object OBQ in the volatile memory MR1 by specifying that the current object OB (in this case OBL1 in this example) has been analyzed during the analysis S8.

It is thus considered that an object OB has been analyzed (or inspected) within the meaning of the disclosure when the steps S14 and S16 are finished, i.e. when each reference RF of the object OB under consideration has been identified and its respective type TP has been defined.

Note that if, during the identifying step S14, the first device DV1 detects that the current object OB does not comprise any reference RF, the method continues directly to the updating step S18, without carrying out the defining step S16.

In general, the marking object OBQ allocated in S6 in the memory MR1 comprises marking information associated with the objects OB of the tree 30, these objects OB being in the memory MR1 or MR2. This marking information indicates for each object OB of the tree 30 whether or not said object has already been analyzed during the analysis S8. By regularly updating them (step S18), this marking information allows the first device DV1 to track the progress of the analysis S8 object by object through the object tree 30.

In this example, all the marking information is centralized in one and the same marking object OBQ, although other implementations are possible. In this way, an address can be dynamically allocated to the marking object OBQ with a variable memory space, which makes it possible to save memory space in the volatile memory MR1.

According to an example, the marking information relating, for example, to the objects OB stored in the volatile memory MR1 are stored, not in the marking object OBQ but in a decentralized manner in each corresponding object OB in the volatile memory MR1. It is also possible to record the marking information relating to the persistent objects OBP directly in the corresponding objects in the non-volatile memory MR2, although this requires writing in the non-volatile memory MR2 which can be more expensive in resources and in time.

In this example, it is supposed that the marking information of the marking object OBQ specify, for each object OB, one from among the 3 following separate states:
  i) a first state ET1 (analyzed) signifying that the object OB has already been analyzed during the analysis S8,
  ii) a second state ET2 (intermediate state) meaning that the object OB has not yet been analyzed but that a reference RF pointing to said object OB has already been identified during said analysis S8, and
  iii) a third state ET3 (not discovered) meaning that the object OB has not yet been analyzed and that no reference RF pointing to said object OB has yet been identified during the analysis S8.

Thus, the update is S18 is made in this example such that the marking information of the marking object OBQ define one from out of the three aforementioned states ET1, ET2 and ET3 for each object OB at a current time. In particular, the state ET2 corresponds to an intermediate state in which an object OB has not yet been analyzed but has already been discovered during the analysis S8 thanks to at least one reference RF identified in another object, which points to said object OB.

In the remainder of this example, the abstraction according to Dijkstra et al. is adopted to visually represent the state of each object OB during the analysis S8 in such a way as to facilitate understanding of the disclosure. According to the Dijkstra model, one attributes to each object OB of the tree 30 a color representing the current state of the object under consideration, according to one out of the three aforementioned states ET1, ET2 and ET3, such that:
  an object OB in the state ET1 (object already analyzed during the analysis S8) is represented in black;
  an object OB in the intermediate state ET2 (object not yet analyzed but for which at least one reference RF of another object pointing to it has already been identified) is represented in gray; and
  an object OB in the state ET3 (object not yet analyzed and for which no reference RF pointing to it has yet been identified) is represented in white.
  Other representations are however possible.

Furthermore, once the update S18 has been made, the first device DV1 determines (S20, FIG. 4) whether or not there exists at least one other object OB in the object tree 30 which has not yet been analyzed during the analysis S8 and to which points at least one strong reference RF (of type TP1) from an object OB which has already been analyzed. In other words, the first device DV1 checks in step S20 whether or not there still exists in the object tree 30 at least one object OB in the intermediate state ET2 (gray color according to the Dijkstra model) and to which points at least one strong reference RF (TP1). If such is the case, the first device DV1 continues the analysis S8 by doing again the steps S10-S20 for each object OB detected in this intermediate state ET2 and to which points at least one strong reference RF (TP1). If not, the analysis S8 comes to an end and the method continues with the collecting step S22.

Thus, the analysis S8 starts with the persistent roots RC and continues along the object tree 30 only for each referenced object OB (of gray color according to Dijkstra) to which points at least one strong reference RF (type TP1) from an object OB which has already been analyzed (of black color according to Dijkstra). In this example, it can be considered that the persistent roots RC previously detected in S4 themselves constitute strong references (type TP1).

Thus, in the example under consideration here, it is supposed that the first device DV1 detects (S20) that the transient object OBT4, the persistent object OBP1, the object OBC1 and the locating object OBL2 are all in the intermediate state ET2 (gray) and that at least one strong reference RF (TP1) points to each of these objects. The first device DV1 therefore repeats the steps S10-S20 as already described above to analyze the objects OBT4, OBP1, OBC1 and OBL2. By analyzing these objects, the first device DV1 thus identifies (S14) the associated reference or, where applicable, references RF and defines their respective type TP according to the predefined criteria CR.

As represented in FIG. 7, it is now supposed that the analysis S8 (FIG. 4) has continued and that the first device DV1 has analyzed the following objects:
  the object OBL1 comprising the strong reference RFL1a pointing to the locating object OBL2, the strong reference RFL1b pointing to the clone object OBC1 and the weak reference RFL1c pointing to the persistent object OBP1;
  the clone object OBC1 which does not comprise any reference RF;
  the locating object OBL2 comprising a strong reference RFL2a pointing to a clone object OBC2 and a weak reference RFL2b pointing to a persistent object OBP2 located in the non-volatile memory MR2;
  the clone object OBC2 which does not comprise any reference RF;
  the transient object OBT4 which does not comprise any reference RF;
  the persistent object OBP1 which comprises a strong reference RFP1a pointing to another persistent object OBP3 in the non-volatile memory MR2; and
  the persistent object OBP3 which does not comprise any reference RF.

Furthermore, still during the analysis (S8) of the persistent object OBP3, the first device detects in S10 that this current object OBP3 is stored in the non-volatile memory MR2 and that it does not possess a copy in the volatile memory MR1. Consequently, as already described, the first device DV1 allocates (S12) in the volatile memory MR1 a locating object OBL3 and a clone object OBC3 associated with the current object OBP3, as represented in FIG. 7. The locating object OBL3 thus comprises a first reference RFL3a pointing to the clone object OBC3 in the volatile memory MR1 and a second reference RFL3b pointing to the persistent object OBP3 in the non-volatile memory MR2. These new objects OBL3 and OBC3 are then integrated into the object tree 30. In this example, the first device DV1 further defines a reference RFL2c pointing from the locating object OBL2 in the volatile memory MR1 to the locating object OBL3 in the volatile memory MR1. The operating system (OS) of the first device DV1 knows the structure which stores the locating objects OBL since it is the system that maintains it, as will be understood by those skilled in the art. In this example, this structure is a linked list of objects OB, as represented in FIG. 7. The operating system knows how to find the end of a linked list to which a newly created locating object OBL must be connected. This new reference RFL2c is thus identified (S14) and defined (S16) as a weak reference (TP2) in accordance with the predefined criteria CR1 already described above since the locating object OBL3 to which points the reference RFL2c has been allocated during the analysis S8 (the aforementioned condition a) is met).

In this example, the first device DV1 detects (S14) that the persistent object OBP3 being analyzed does not comprise any reference RF and thus updates (S18) the marking object OBQ to specify there that the persistent object OBP3 has been analyzed (black color according to the Dijkstra model).

As represented in FIG. 7, at this stage, the objects OBL1, OBC1, OBP1, OBL2, OBC2, OBP3, OBT4 are all in the state ET1 (black color according to Dijkstra) since they have been completely analyzed (or inspected) by the first device DV1. The persistent object OBP2 is, on the other hand, in the intermediate state ET2 (gray color according to Dijkstra) since the reference RFL2b pointing to it has been discovered during the analysis of the locating object OBL2 but this sole reference pointing to it is of type TP2 (weak) such that the object OBL2 has not been analyzed.

Still in this example, since only a weak reference (namely RFL2c) points to the locating object OBL3, the latter is not analyzed during the analysis S8 according to steps S10-S20 already described above (step S20, FIG. 4). The analysis S8 does not therefore continue along the tree 30 from the locating object OBL2 to the locating object OBL3. The locating object OBC3 is therefore not analyzed during the analysis S8 either, since it is only linked in the tree 30 by the reference RFL3a coming from the locating object OBL3 (FIG. 7). This reference RFL3a linking two objects OB allocated during the analysis S8 is considered as a weak reference (type TP2) by the first device DV1.

The reference RFL3b pointing from the locating object OBL3 to the persistent object OBP3 is also considered as being a weak reference (type TP2) as it is included in an object (OBL3) which has been allocated during the analysis S8 (FIG. 7).

Figure 8:
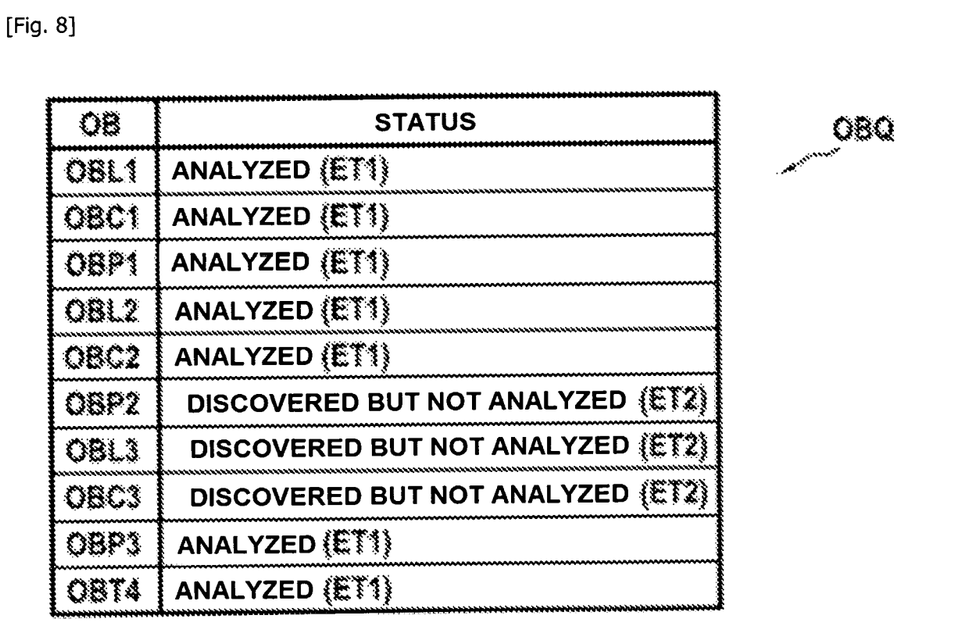
FIG. 8 schematically represents marking information contained in a marking object, according to an aspect of the disclosure.

At this stage, it is considered in this example that the analysis S8 is finished. As represented in FIG. 8, the marking object OBQ which has been updated throughout the analysis S8 then indicates that all the aforementioned objects OB of the tree 30 have been analyzed (state ET1, black color according to Dijkstra), except for the objects OBP2, OBL3 and OBC3 which are in the intermediate state ET2 (gray color according to Dijkstra) since, although they have been discovered during the analysis S8, they have not been analyzed since no strong reference RF (type TP1) points to them.

The analysis S8 is considered finished when all the objects OB reachable in the tree 30 from at least one persistent root RC exclusively through strong references RF (type TP1) have been analyzed. In other words, the first device DV1 detects (S20) that the analysis S8 is finished when it has analyzed all the objects OB of the object tree 30 to which points at least one strong reference RF.

Other objects OB (not represented)—so-called external objects—which are not part of the object tree 30 are also liable to be present in the volatile memory MR1 and/or in the non-volatile memory MR2. No reference RF points from an object OB of the tree 30 to an external object OB. Once the analysis S8 is finished, each external object OB present in the volatile memory MR1 and in the non-volatile memory MR2 finds itself in the state ET3 (white color according to Dijkstra) insofar as these objects have not been discovered during the analysis S8.

In a variant, the marking information contained in the marking object OBQ only pertain to the objects OB which are present in the object tree 30 on initiation of the collecting method (during step S6). In this case, when the first device DV1 allocates new objects in the volatile memory MR1 during the analysis S8, these new objects are not specified in the marking information. By default, the objects OB generated during the analysis S8 (unknown in the marking information) are considered as not having been analyzed during the analysis S8.

On detection that the analysis S8 is finished, the first device DV1 performs a collecting step S22 (FIG. 4) in the memories MR1 and MR2 to delete each object OB which has not analyzed during the analysis S8. In other words, the objects OB which are in the intermediate state ET2 (gray color according to the Dijkstra model) or in the undiscovered state ET3 (white according to the Dijkstra model) are considered as being unreachable in the object tree 30 and are consequently deleted in order to free up memory space. An object OB is considered unreachable if it is not connected to one of the persistent roots RC (RC1, RC2 or RC3 in this example) solely through strong references RF (type TP1) in the object tree 30.

Thus, the objects of the tree 30 to which no strong reference RF points, along with the objects OB external to the tree 30, are deleted from the memories MR1 and MR2.

In the example under consideration here, the first device DV1 performs this collecting step S22 by selecting (S24, FIG. 4) the objects OB to be deleted as a function of the marking information contained in the marking object OBQ. As already indicated, the marking information makes it possible to identify the objects OB that have been analyzed during the analysis S8 and those which have not been. Once the selection S24 has been made, the first device DV1 deletes (S26) the objects OB selected in S22.

Figure 9:
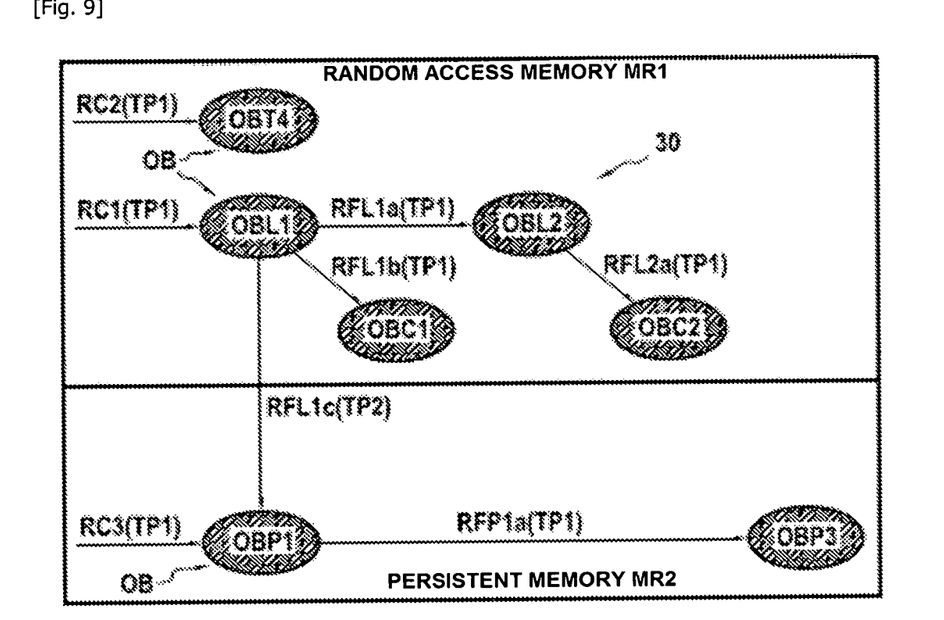
FIGS. 9 and 10 schematically represent an object tree in the memory of the system of FIG. 1, during a collecting method according to an aspect of the disclosure.

As represented in FIG. 9, in this particular example, the first device selects (S24) and therefore deletes (S26) the object OBP2 from the non-volatile memory MR2 along with the objects OBL3 and OBC3 from the volatile memory MR1.

The collection S22 may where applicable be interrupted before the deletion of all the objects OB selected in S24, if the first device DV1 detects that no sufficient memory space has been freed up in the memories MR1 and MR2.

Furthermore, as also shown in FIG. 9, the first device DV1 can also delete the marking object OBQ from the volatile memory MR1 during the collecting step S22, in order to further free up even more memory space.

The marking object OBQ can thus be deleted during the collecting S22 after the analysis S8 phase. The marking object OBQ can be kept until the end of the analysis S8 in order to allow the first device DV1 to determine when the analysis S8 comes to its end. In a variant, the marking object OBQ can be kept during the collecting S22 if there is no need to gain more memory space in the volatile memory MR1. If it is collected, the collecting of the marking object is done at the end of the collecting process in order to allow the first device DV1 to know what objects OB must be kept.

According to an example, during the creating step S6 and the updating steps S18, the marking object OBQ is recorded in a memory container with each other object OB of the object tree 30 contained in the volatile memory MR1.

In this document, a memory container is a software abstraction of a physical memory space, generally bounded in size (e.g. the object stack is an object container). The operating system of the first device DV1 is typically in charge of supplying allocation and freeing-up routines for using this container.

More generally, the first device DV1 can store in its volatile memory MR1 various types of object, in particular locating objects OBL, clone objects OBC and transient objects OBT. The first device DV1 can be configured to store all these objects in one and the same container in its volatile memory MR1.

By having all these objects co-inhabit one and the same memory container in the volatile memory MR1, one allows for the maximal use of the volatile memory MR1 by comparison with a solution based on memory segmentation. Specifically, a segmentation presupposes the static creation of several containers, namely at least: one container for the locating data OBL, one container for the clone objects OBC and one container for the transient objects OBT. It is however difficult to estimate in advance the optimal sizes for each of these containers. The number of objects which are loaded into the volatile memory MR1 particularly depends on the commands executed during the execution of the application APP1. An execution therefore performs better in terms of memory consumption if the aforementioned objects are made to co-inhabit one and the same memory container.

Figure 10:
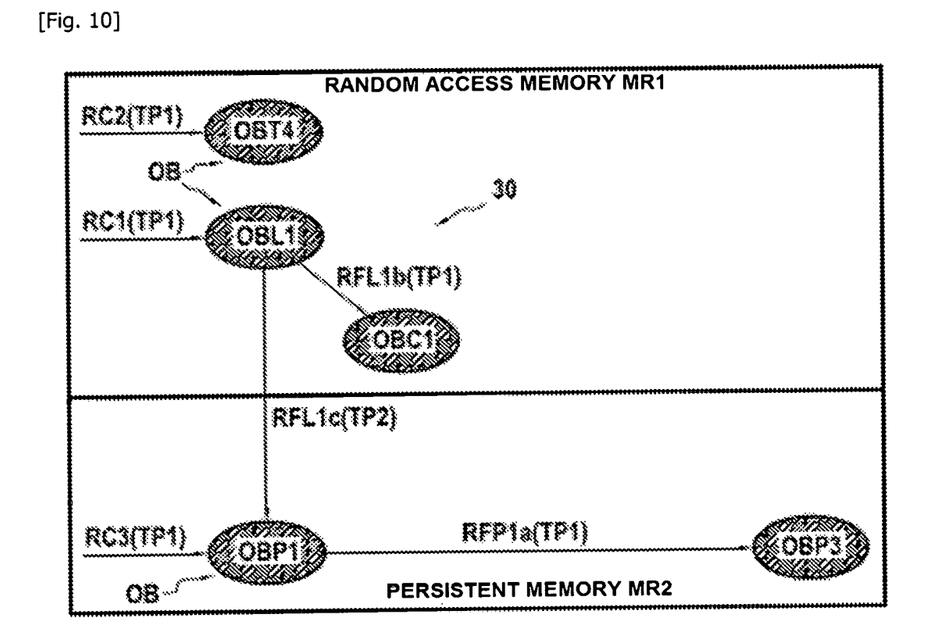

As represented in FIG. 10, during the collecting step S22, the first device DV1 can also delete from the volatile memory MR1 each clone object OBC representing the copy of any object OB deleted from the non-volatile memory MR2 during the collection S22. In other words, when the first device DV1 collects a persistent object OBP from the non-volatile memory MR2, it calls a first finalization routine to also collect (delete) the associated clone object OBC from the volatile memory MR1. In this example, the clone object OBC2 is therefore deleted from the volatile memory MR1 in response to the deletion of the persistent object OBP2 from the non-volatile memory MR2. The deletion of the clone object OBC2 (although linked to the object OBL2 by a strong reference RF) makes it possible to free up more memory space and avoid any memory corruptions.

As represented in FIG. 10, during the collecting step S22, the first device DV1 can also delete from the volatile memory MR1 each locating object OBL which is associated with any clone object OBC deleted from the volatile memory MR1 during the collection S22. In other words, when the first device DV1 collects a clone object OBC from the volatile memory MR1, it calls a second finalization routine to also collect (delete) the locating object OBL from the volatile memory MR1. In this example, the locating object OBL2 is therefore deleted with the clone object OBC2 from the volatile memory MR1. The deletion of the locating object OBL2 (although linked to the object OBL1 by a strong reference RF) makes it possible to free up more memory space and avoid any memory corruptions.

In general, the first and second finalization routines mentioned above together make it possible to free up more memory space by deleting the locating object OBL and the clone object OBC associated with each persistent object OBP which is deleted in the non-volatile memory MR2 during the collection S22.

Aspects of the disclosure advantageously allow the implementation of an efficient garbage collector in an architecture (the system SY) comprising a volatile memory MR1 and a non-volatile memory MR2, storing objects OB from an object-oriented language, so as to quickly and cheaply free up memory space in these memories. During this collection process, as many as possible of the relevant objects OB liable to be invoked subsequently by the first device DV1 are kept in the memory, on the basis of criteria CR1 which are predefined in this regard.

The garbage collector of the disclosure makes it possible to select and delete the unreachable objects contained both in a volatile memory and in a non-volatile memory of the system in order to free up a maximum of memory space.

Aspects of the disclosure are compatible with applications of interpreted type, particularly with Java Card bytecode.

Figure 11:
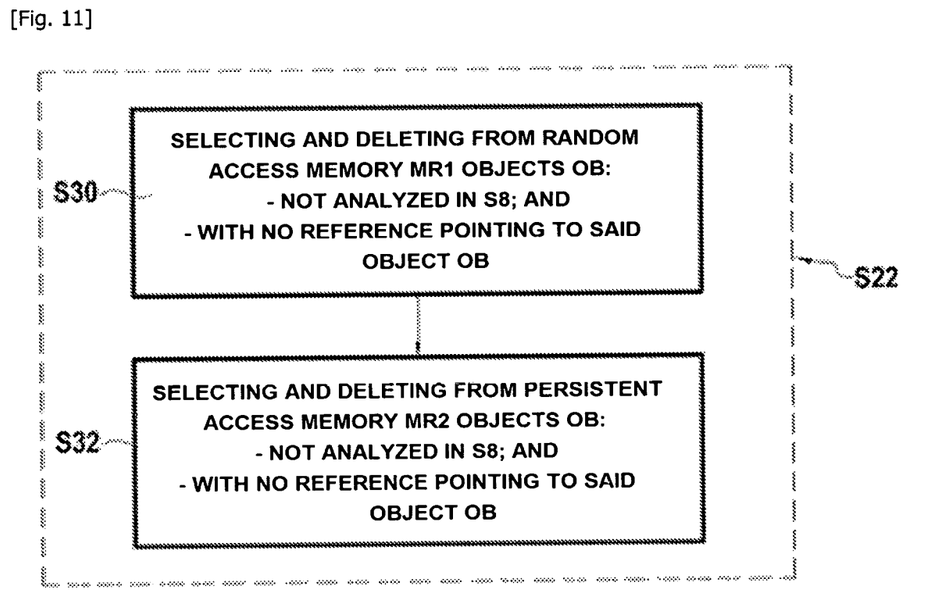
FIG. 11 represents, in the form of a diagram, the steps of a collecting method according to an aspect of the disclosure.

According to an example represented in FIG. 11, during the collecting step S22, the first device DV1 implements a mechanism of gradual collection during which it deletes in decreasing order of priority:

at least one first object OB in the state ET3 in the volatile memory MR1 which has not been analyzed during the analysis S8 and for which no reference RF has been identified as pointing to said first object OB (step S30); then at least one second object OB in state ET3 in the non-volatile memory MR2 which has not been analyzed during the analysis S8 and for which no reference RF has been identified as pointing to said at least one second object OB (step S32).

In this case, the first device DV1 can thus first delete (S30) all the objects OB which have not been analyzed or even discovered (state ET3) from the volatile memory MR1 during the analysis S8, then all the objects OB which have not been analyzed or even discovered (state ET3) from the non-volatile memory MR2 during the analysis S8.

This gradual collection mechanism makes it possible to perform as a priority the collection of the undiscovered objects (white according to the Dijkstra model) during the analysis S8, and this in two successive passes in decreasing order of priority. As a priority the collector deletes unanalyzed objects OB from the volatile memory MR1 for which no reference RF has been identified as pointing to said object, then the objects OB in the same situation from the non-volatile memory MR2. The collecting S22 may where applicable be interrupted before deletion of all the objects OB not discovered during the analysis S8, if the first device DV1 detects that sufficient memory space has been freed up in the memories MR1 and MR2.

Each deletion equates to a writing operation, the latter being more expensive in time and in resources in the non-volatile memory MR2 than in the volatile memory MR1. Thus, this gradual collection mechanism makes it possible to increase the collection speed by deleting as a priority the objects OB from the volatile memory MR1. This variant uses at least the persistent memory for reasons of speed and power consumption performance.

Furthermore, this gradual collection mechanism makes it possible to free up only the necessary space in the memories MR1 and MR2, while maintaining the cache effect in the volatile memory MR1 as much as possible. The collector deletes as a priority from the volatile memory MR1 the objects which are the least liable to be subsequently invoked since they are not reachable via strong references RF in the object tree 30 from the roots RC. The predefined criteria CR1 described previously make it possible to sort the objects OB which are the most liable to be subsequently invoked from among all the objects present in the memories MR1 and MR2.

Moreover, as indicated above, each object analysis requires a clone object OBC in the volatile memory MR1. If such a clone object does not exist, it must be allocated in the volatile memory MR1. Due to intrinsic size limitations, the volatile memory MR1 is liable to be saturated (full) before the end of the analysis S8 of all the objects OB of the tree 30. The first device DV1 can therefore also implement an anticipative collection during the analysis S8 (before it finishes) such as to select and delete appropriate objects OB from the memories MR1 and MR2, thus freeing up enough memory space to continue the analysis S8.

During this anticipative collection, the first device DV1 can for example delete as a priority objects OB from the tree 30 which have already been analyzed (state ET1, black color according to the Dijkstra model) and which are not associated with an application APP1 during execution. This however avoids deleting clone objects OBC which have been created for the application in progress APP1. This application APP1 thus benefits from its clone objects still present in the volatile memory MR1, thus facilitating access to useful data.

In this disclosure the term "application being executed" should be understood to mean any application that the first device DV1 executes at the time of the collecting method or which has been interrupted before the initiation of the collecting method and the execution of which is liable to resume once the collecting method is finished.

Figure 12:
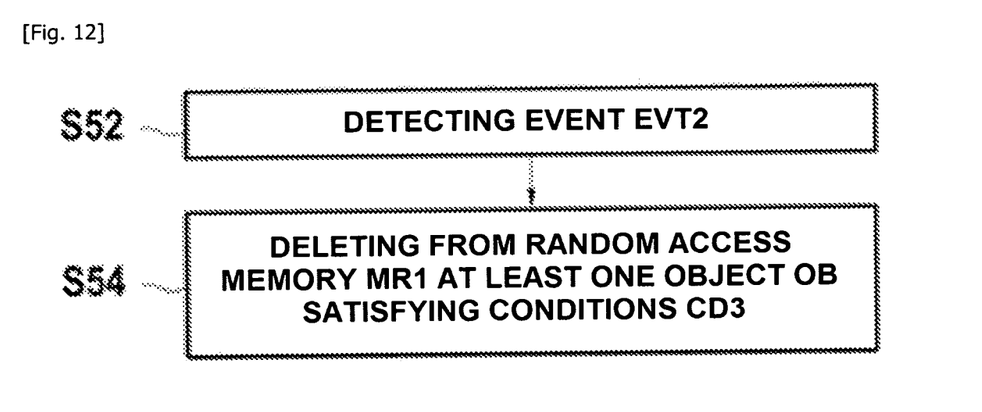
FIG. 12 represents, in the form of a diagram, the steps of a collecting method according to an aspect of the disclosure.

According to a particular example represented in FIG. 12, on detection (S52) of a predefined event EVT2 before the finishing of the analysis S8, the first device DV1 performs an anticipative collection during which it carries out a deletion (S54) as a priority from the volatile memory MR1 of at least one object OB, the so-called collected object, which satisfies the following conditions CD3:

the collected object OB (state ET1, black according to the Dijkstra model) has already been analyzed during the analysis S8;

the collected object OB is not associated with an application APP1 being executed; and the object OB is a clone object OBC or a locating object OBL.

This event EVT2 corresponds for example to the saturation of the volatile memory MR1 or to the detection that the level of occupancy of the volatile memory MR1 reaches a predefined threshold. This anticipative collection can be done once or a plurality of times during the collecting method of the disclosure (i.e. during the analysis S8). One may thus anticipatively delete clone objects OBC with their associated locating object OBL from the volatile memory MR1 during the analysis S8 since the volatile memory is saturated before this analysis has even ended. The clone objects OBC and locating objects OBL which have already been analyzed and which are not associated with the application APP1 are deleted as a priority from the volatile memory MR1, until the necessary memory space is freed up, since there is a lower probability that these objects may be needed later. These objects have already been scanned in S8 and are therefore a priori no longer useful in the analyzing step S8 for identifying references RF in the object tree 30. Furthermore, these objects are not a priori liable to be invoked in the execution of the application APP1.

This makes it possible to promote a cache effect for objects kept in the volatile memory MR1. After the collection S22, as many objects OB as possible which are relevant are kept in the volatile memory MR1, which makes it possible to avoid accessing it again from the non-volatile memory MR2 (which consumes time and power).

If the memory space thus anticipatively freed up is not sufficient, the first device DV1 can also be configured to anticipatively collect, during the analysis S8 (FIG. 4), as a priority from the volatile memory MR1 at least one object OB which has not yet been analyzed during the analysis (state ET3, white according to the Dijkstra model), which is not associated with an application in progress (APP1 for example), and which is a clone object OBC or a locating object OBL.

This makes it possible to further promote the cache effect to keep after collection a maximum of objects OB which are relevant in the volatile memory MR1.

Those skilled in the art will understand that the examples and variants described above constitute only non-limiting examples of implementation of the disclosure. In particular, those skilled in the art can envision any adaptation or combination of the examples and variants described above in order to meet a very specific need.

The invention claimed is:

1. A collecting method, implemented by a first electronic device including, a first memory of volatile type, the first electronic device interacting with a second electronic device including a second memory of non-volatile type, the first and second memories comprising objects each constituting an instance of an object-oriented language class, each object being able to comprise at least one reference pointing to another object, the method comprising:

detecting at least one object in the first memory and at least one object in the second memory constituting persistent roots;

scanning at least a part of the objects contained in the first and second memories by running, from the persistent roots, through an object tree dynamically determined from each reference, included in the analyzed objects, that points to another object; wherein said scanning comprises;

performing an analysis of an object of the object tree, wherein the analysis comprises:

allocating, if the analyzed object is in the second memory and has no copy in the first memory, in the first memory a clone object, representing a copy of the analyzed object, and also a locating object, comprising a first reference pointing to the clone object in the first memory and a second reference pointing to the analyzed object in the second memory;

identifying each reference, contained in the analyzed object, pointing in the object tree to a referenced object;

defining, for each identified reference, a type of the reference from among a group of strong reference or a weak reference, in accordance with predefined criteria;

iteratively repeating the analysis solely for each object of the object tree which a strong reference contained in an already analyzed object points to; and upon detecting that the scanning is finished, collecting in the first and second memories for deleting each object that has not been analyzed during the analysis.

2. The method according to claim 1, wherein, during the scanning, each reference of an analyzed object is defined as a weak reference if at least one of the following conditions is satisfied:

the reference points to any object that has been allocated in the first memory during the analysis; and the reference is a reference of a locating object contained in the first memory, the reference pointing to an associated object contained in the second memory.

3. The method according to claim 1, wherein, during the-scanning, each reference of an analyzed object is defined as a strong reference if the reference points to an object which has been allocated in the first memory prior to the analysis and if the reference does not point from the first to the second memory.

4. The method according to claim 1, wherein the method is triggered on detection of a predefined event comprising at least one of:

receiving an order issued by an operating system of the first electronic device or by an application executed by said first electronic device; or detecting that the first memory or the second memory is saturated or has reached a predefined occupancy threshold.

5. The method according to claim 1, further comprising:

allocating, in the first memory, a marking object comprising marking information associated with each object already present in the first and second memories on initiating the scanning; and updating during the scanning such that the marking information indicates for each associated object whether the object has already been analyzed during the analysis, has not yet been analyzed but for which a reference pointing to the object has already been identified, or has not yet been analyzed and for which no reference pointing to the object has yet been identified;

the collecting being made by selecting the objects to be deleted as a function of the marking information.

6. The method according to claim 5, wherein the marking object is collected from the first memory during the collection.

7. The method according to claim 5, wherein the marking object is recorded in a memory container with each other object of the object tree contained in the first memory.

8. The method according to claim 5, wherein each object, of the object tree, contained in the first volatile memory is one selected from among the group of:

a transient object, instantiated by any application;

a clone object representing a copy of an object present in the second memory;

a locating object allocated in the first memory in association with a clone object of the first memory and a corresponding object in the second memory; or the marking object.

9. The method according to claim 1, wherein during the collecting, the first electronic device deletes in decreasing order of priority of:

at least one first object in the first memory that has not been analyzed during the analysis and for which no reference has been identified as pointing to the at least one first object; and at least one second object in the second memory which has not been analyzed during the analysis and for which no reference has been identified as pointing to the at least one second object.

10. The method according to claim 1, wherein the first electronic device detects that the scanning is finished when it has analyzed all the objects of the object tree to which points at least one strong reference.

11. The method according to claim 1, wherein the collecting comprises deleting, from the first memory, each clone object representing the copy of any object deleted from the second memory during the collection.

12. The method according to claim 1, wherein the collecting comprises deleting, from the first memory, each locating object which is associated with any clone object deleted from the first memory during the collecting.

13. The method according to claim 1, wherein the method further comprises, on detection of a predefined event before said scanning is finished, an anticipative collecting during which the first electronic device deletes at least one collected object, that satisfies the following conditions:

the collected object has already been analyzed during said analysis;

the collected object is not associated with an application being executed; and the collected object is a clone object or a locating object.

14. A first electronic device, containing a first memory of volatile type, the first electronic device being configured to interact with a second electronic device containing a second memory of non-volatile type, the first and second memories comprising objects each constituting an instance of an object-oriented language class, each object being able to comprise at least one reference pointing to another object, the first electronic device comprising:
  a detecting module for detecting at least one object in the first memory and at least one object in the second memory constituting persistent roots;
  an scanning module configured to scan at least a part of the objects contained in the first and second memories by running, from the persistent roots, through an object tree dynamically determined from each reference, included in the analyzed objects, that points to another object; wherein the scan comprises:
    performing an analysis of an object of the object tree, wherein the analysis comprises:
      allocating, if the analyzed object is in the second memory and has no copy in the first memory, in the first memory a clone object, representing a copy of the analyzed object, as well as a locating object, comprising a first reference pointing to the clone object in the first memory and a second reference pointing to the analyzed object in the second memory;
      identifying each reference, contained in the analyzed object, pointing in the object tree to a referenced object; and
      defining, for each identified reference, a type of the reference from among a group of strong reference or a weak reference, in accordance with predefined criteria;
    iteratively repeating the analysis solely for each object of the object tree which a strong reference contained in an already analyzed object points to; and
  a collecting module configured, upon detecting that the scan is finished, to delete from the first and second memories each object that has not been analyzed by the scanning module during the scan.

* * * * *